UNITED STATES PATENT OFFICE.

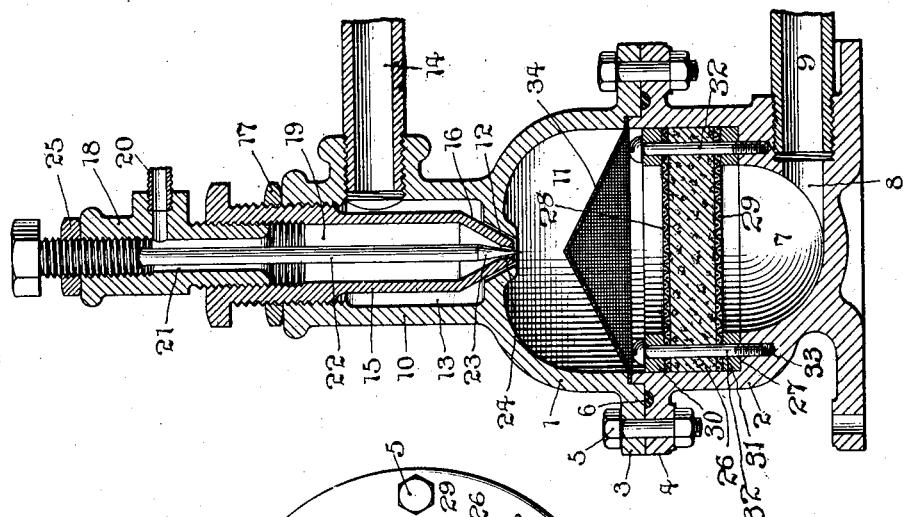
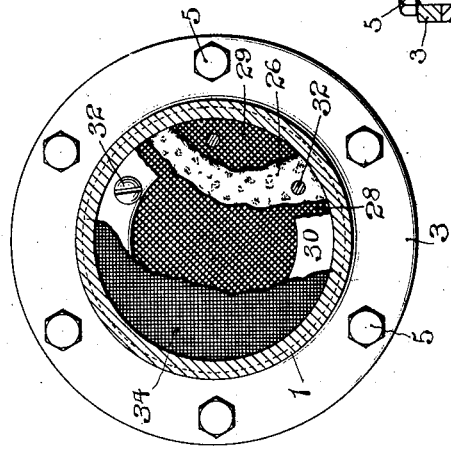
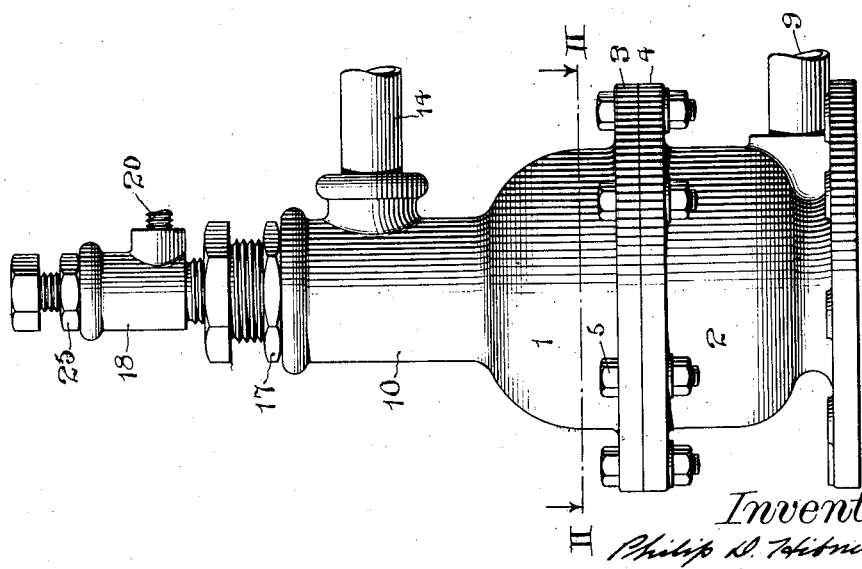

PHILIP D. HIBNER, OF SEATTLE, WASHINGTON.

MEANS FOR CONVERTING LIQUID FUEL INTO A COMPRESSED COMBUSTIBLE MIXTURE.

1,388,430.  Specification of Letters Patent.  Patented Aug. 23, 1921.

Application filed January 27, 1919. Serial No. 273,365.

*To all whom it may concern:*

Be it known that I, PHILIP D. HIBNER, a citizen of the United States, and resident of the county of King, city of Seattle, and State of Washington, have invented a new and useful Improvement in Means for Converting Liquid Fuel into a Compressed Combustible Mixture, of which the following is a specification.

The object of my invention is to provide means for forcing air and liquid fuel into a mixing chamber against and through a dense porous body having a non-absorbent framework, to produce a compressed combustible mixture having a very complete vaporization; said porous body being of considerable thickness and preferably maintained in a more or less compressed state to resist to a greater or lesser degree the passage of the air and liquid fuel therethrough.

A further object is to provide a partition body of the above character in which the framework is of a non-absorbent nature which will spread the liquid fuel in numerous films over its surfaces so that as the air passes through the numerous passages of various shapes and sizes a very complete breaking up of the air and liquid particles is obtained.

A practical means for carrying out my invention is represented in the accompanying drawings in which, Figure 1 represents the device in side elevation.

Fig. 2 represents a transverse horizontal section taken in the plane of the line II—II of Fig. 1, and Fig. 3 represents the device in vertical central section.

The casing which contains the mixing chamber is herein shown as comprising an upper member 1 and a lower member 2 having peripheral flanges 3 and 4 respectively by means of which the two members may be united by suitable fastening devices such as bolts 5. A packing ring 6 may be interposed between the meeting faces of the flanges 3 and 4. The lower space 7 of the mixing chamber is provided with an outlet 8 for the compressed combustible mixture which outlet is in open communication with the tube 9 which may lead to a compressed combustible mixture reservoir (not shown herein).

The upper member 1 of the casing is provided with a hollow vertical extension 10 forming part of an injector, the interior of which extension communicates with the upper space 11 of the mixing chamber through a tapered inlet 12. Compressed air is supplied to the chamber 13 in the extension 10 through the tube 14.

A hollow injector nozzle 15 has a screw threaded engagement in the upper end of the tubular extension 10. The lower end of this nozzle is tapered as shown at 16 and is located within the tapered inlet 12. By screwing the nozzle 15 upwardly or downwardly the distance between the tapered portion 16 of the nozzle and the wall of the tapered inlet 12 may be increased or diminished to accurately regulate the flow of compressed air therethrough. A lock nut 17 may be provided for locking the nozzle 15 in its adjusted position. A hollow extension 18 is screw threaded into the upper end of the nozzle 15 and the interior 19 of the nozzle 15 is in open communication with a liquid fuel supply line through a tube 20 and the bore 21 of the extension 18.

A needle valve 22 has a screw threaded engagement with the upper end of the extension 18 of the nozzle, the tapered lower end 23 of the needle valve being arranged to increase or diminish the size of the discharge port 24 of the nozzle as the needle valve is screwed upwardly or downwardly in the extension 18 to accurately regulate the flow of the liquid fuel. A lock nut 25 is provided for locking the needle valve in its adjusted position.

A dense porous partition 26 is located within the mixing chamber against and through which the compressed air and liquid fuel is forced. This porous partition is composed of a porous body preferably of considerable thickness. The material which I have found most suitable for this purpose is a sponge which has passages therethrough which are tortuous and of various sizes and shapes and the framework whereof is non-absorbent serving to spread the liquid fuel in thin films along its walls without absorbing the liquid or holding it in mass. This I have found helps materially in bringing an intimate admixture of the air and liquid particles.

The lower member 2 of the casing is provided with an interior annular shoulder 27 upon which the partition is secured. In the present instance the porous body with its non-absorbent framework is shown as being confined between the upper and lower woven wire or other foraminated screens 28, 29 and upper and lower rings 30, 31. Screws 32 pass through the rings, screens and porous body and are screw threaded into holes 33 in the lower member 2 of the casing. By screwing these screws downwardly or upwardly the porous body may be placed under greater or lesser compression and thereby exert greater or lesser resistance to the passage of the compressed air and liquid fuel therethrough.

I preferably locate a woven wire or other foraminated screen 34 within the mixing chamber between the nozzle inlet and the partition and spaced from the partition to act as a means for breaking up and spreading the jet from the injector before it reaches the partition.

In operation: the air and the liquid fuel are forced through the injector into the mixing chamber against and through the screen 34 and against and through the dense porous partition into the lower space of the mixing chamber and from thence through the outlet 8 to the compressed combustible mixture reservoir or other desired point.

The skeleton or framework of the partition is such that the particles of liquid fuel will be caused to be deposited in thin films upon the walls of the numerous irregularly formed non-absorbent pores throughout the partition, and the air in passing through the pores in intimate contact with said films will insure a very complete vaporization of the mixture, the same being produced in the form of a compressed combustible mixture.

I wish to distinguish the non-absorbent material which forms the framework or skeleton of my partition from those materials which are inherently absorbent and from those partitions which are built up of numerous screens arranged in juxtaposition and which hold the liquid in mass instead of acting to spread the liquid into thin films.

From the above description, it will be seen that the mixing chamber is in reality a pressure chamber and that an injector is used to drive the air and liquid fuel into the chamber against and through the partition to form the compressed combustible mixture.

It will also be seen that means are provided for independently accurately regulating the flow of both the air and the liquid fuel so as to obtain the best admixture.

What I claim is:

1. In a device of the character described, a mixing chamber, a partition therein composed of a dense porous body of considerable thickness having a non-absorbent framework, and means for forcing air and liquid hydrocarbon into the mixing chamber against and through the said partition to form a compressed combustible mixture.

2. In a device of the character described, a mixing chamber, a partition therein composed of a dense porous body of considerable thickness having a non-absorbent framework, means for forcing air and liquid hydrocarbon into the mixing chamber against and through the said partition to form a compressed combustible mixture, and means located within the mixing chamber and spaced from the partition for breaking up and spreading the combined air and liquid hydrocarbon before it reaches the partition.

3. In a device of the character described, a mixing chamber, a partition therein composed of a dense compressible porous body of considerable thickness having a non-absorbent framework, means for forcing air and liquid hydrocarbon into the mixing chamber against and through the said partition to form a compressed combustible mixture, and means for placing the porous body under greater or lesser compression and thereby exert greater or lesser resistance to the passage of the air and liquid fuel therethrough.

In testimony that I claim the foregoing as my invention, I have signed my name this 21st day of January, 1919.

PHILIP D. HIBNER.